Feb. 9, 1960   J. J. POTTER   2,923,939
MACHINES FOR SECURING HOOKED BELT-FASTENERS
Filed March 29, 1957   5 Sheets-Sheet 2
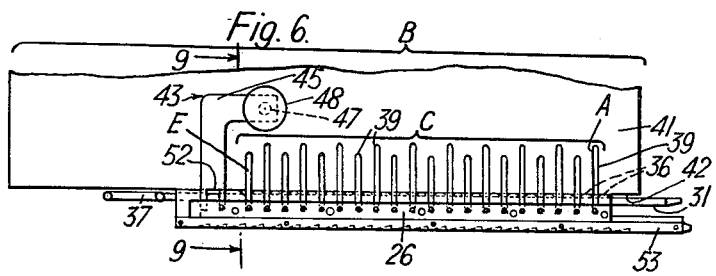
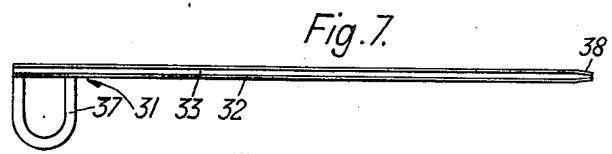
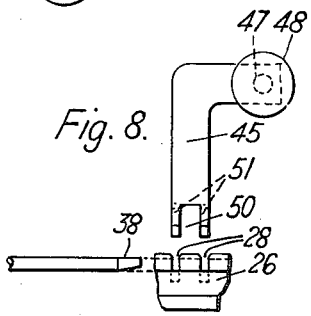
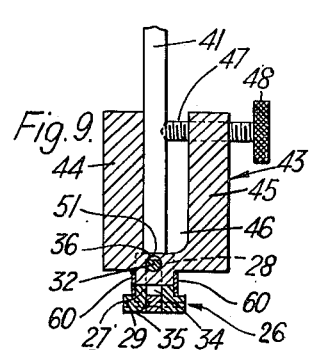
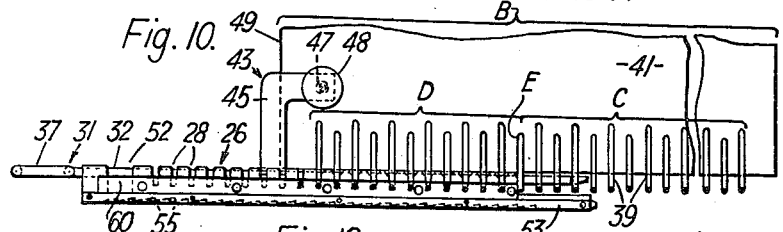
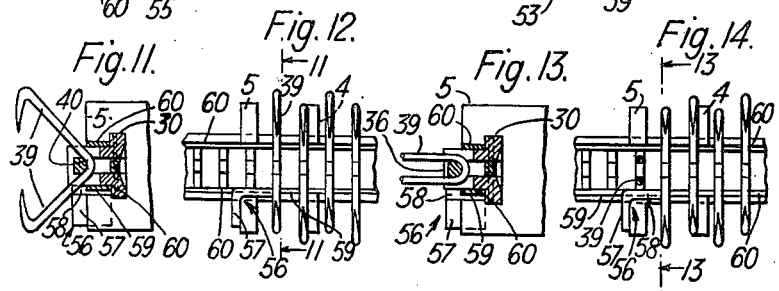
*Inventor*
JOHN JAMES POTTER
By
Watson, Cole, Grindle & Watson
*Attorneys*

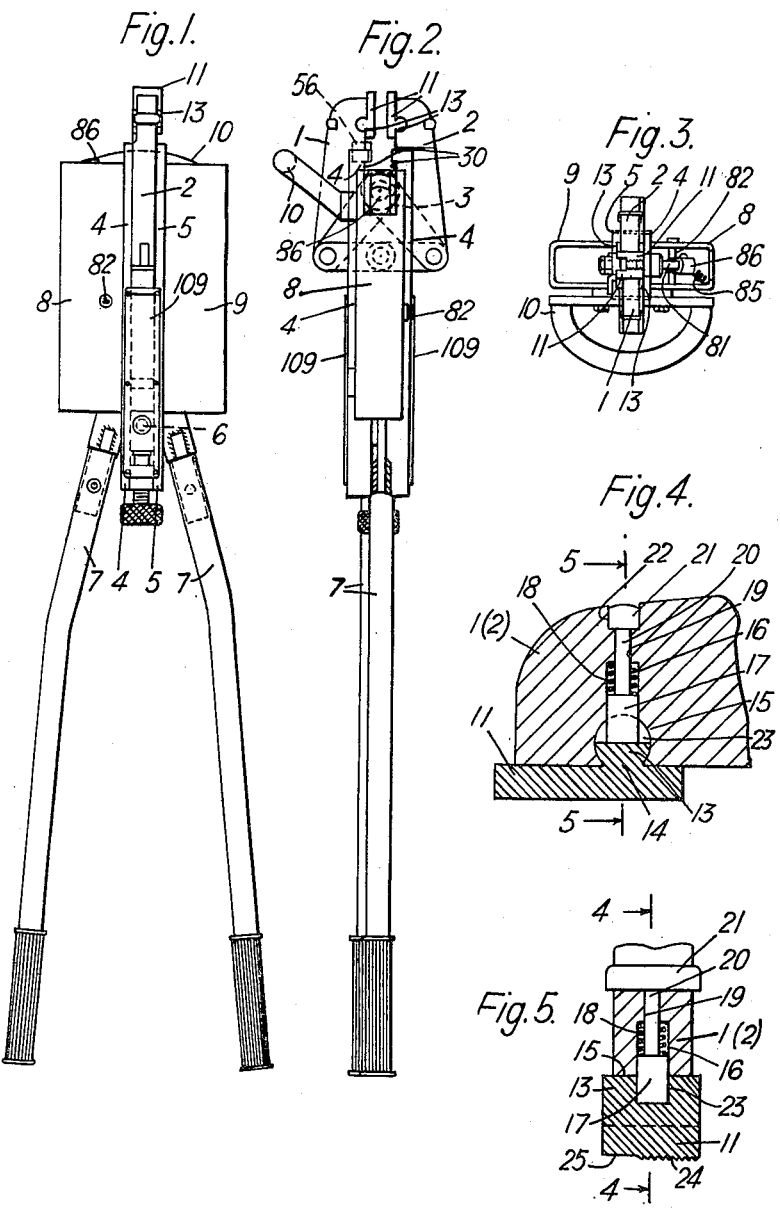

Feb. 9, 1960  J. J. POTTER  2,923,939
MACHINES FOR SECURING HOOKED BELT-FASTENERS
Filed March 29, 1957  5 Sheets-Sheet 3

Inventor
JOHN JAMES POTTER

By
Watson, Cole, Grindle & Watson
Attorneys

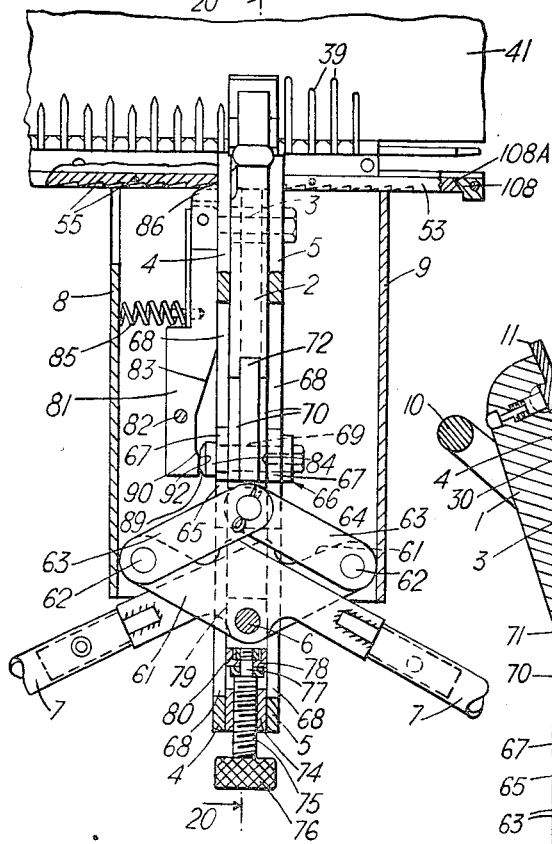
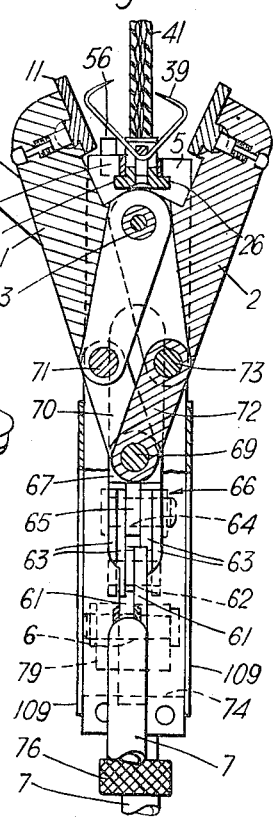

Feb. 9, 1960  J. J. POTTER  2,923,939
MACHINES FOR SECURING HOOKED BELT-FASTENERS
Filed March 29, 1957  5 Sheets-Sheet 5
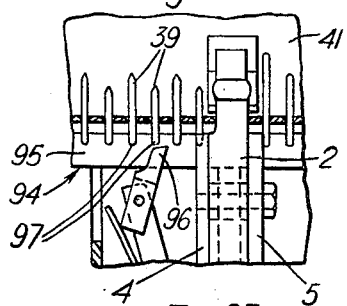
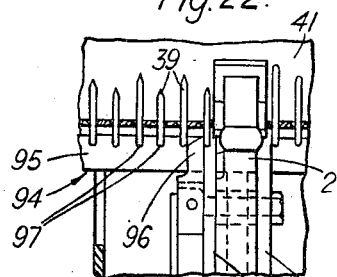
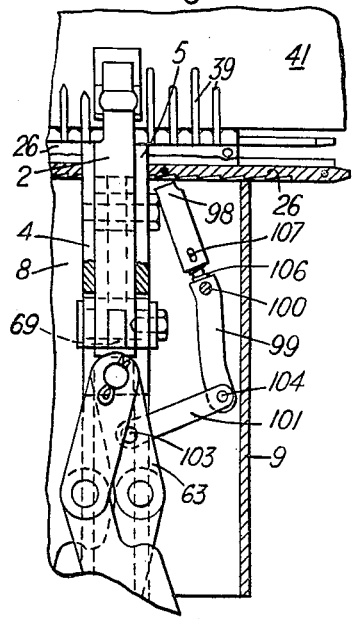
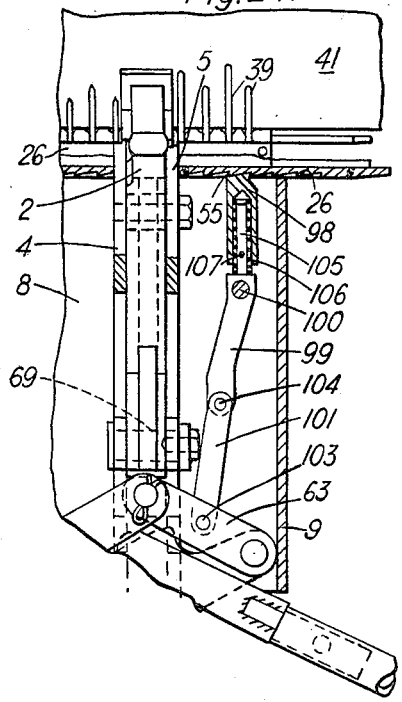
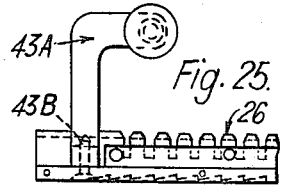
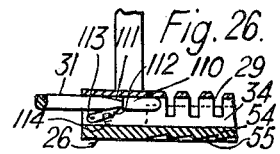
Inventor
JOHN JAMES POTTER
By
Watson, Cole, Grindle & Watson
Attorneys _United States Patent Office_

2,923,939
Patented Feb. 9, 1960

2,923,939

MACHINES FOR SECURING HOOKED BELT-FASTENERS

John J. Potter, Sheffield, England, assignor to Hayden-Nilos Limited, Sheffield, England Application March 29, 1957, Serial No. 649,433

Claims priority, application Great Britain April 30, 1956

8 Claims. (Cl. 1—49.4)

This invention relates to machines for securing hooked belt fasteners of the type in which a pair of pivoted jaws is adapted to be closed on to a comb of open hooks mounted in a comb bar and is movable progressively along the comb bar and transversely of the end of a driving or conveyor belt held close to the comb bar, for successive hooks or groups of hooks to be clinched in the belt end as the jaws are closed between each progressive movement of the jaws.

The open hooks are usually mounted as a comb on a backing member of paper or like stiff sheet, which facilitates the application to the comb bar of a sufficient number of hooks to cover a substantial width of belt-end, so that it is then only necessary to close the jaws and to cause them to progress between closings for this width of belt to be fitted with hooks. When two belt-ends have been thus fitted with hooks, the bases of which form a series of loops, the loops of the two ends are intermeshed and a flexible spindle, e.g., of wire cable, is threaded through the loops.

However, the usual machine has the jaws and the jaw-actuating means mounted as a unit slidable in a frame between limits defined by the side members of the frame, and the comb bar is likewise mounted in the same frame, so that association has to be made between a belt-end and a machine comprising a frame, a comb bar, and a jaw unit, which machine must be at least wide enough to receive the width of the belt that is to receive the hooks. Since, particularly with conveyor belts used in the underground workings of mines, there is often very little space and height, difficulty arises in positioning this relatively bulky and heavy type of machine and in securing the end of the stiff and heavy belt in correct relation to the comb bar. It is usual for the machine frame to be provided with a clamping device for the belt-end, and the positioning of the belt-end in the clamping device can prove very awkward.

It is also usual for the jaws to be actuated from the part of the machine farthest from the comb bar and the belt, e.g., by a pair of long handles or by a screw device or a cam device, and to progress the jaw unit by manually-operated ratchet means after each closing of the jaws; but it has been proposed to progress the jaw unit by a ratchet device carried by the jaw unit to engage a rack on a clamping device of greater width than the belt, for actuation by a jaw-actuating handle that must be swung over the clamping device and, therefore, over the belt.

One object of the invention is to provide a belt-fastening machine that avoids the use of any cumbersome frame, whether for carrying the jaw unit or for the clamping of the belt. A further object is to provide a machine that greatly facilitates its application to a belt, particularly in a confined space, and is very simple in its operation when applied to a belt. Yet a further object is to provide a compact machine that is suitable for narrow belts and yet applicable to the accurate jointing of belts wider than its immediate capacity, in particular by avoiding the use of a frame and/or a clamping device wide enough for the widest belt to be jointed. Other objects and advantages will appear from the following description.

According to the present invention, a belt-fastening machine comprises a jaw unit, including a pair of projecting jaws and actuating means for closing and opening the jaws, and a comb bar adapted to receive open hooks, the jaw unit being interengageable slidably with the comb bar so that the unit and the bar may be assembled with the bar extending in a direction through and transverse to the jaws, there being a pawl projecting in the same direction as the jaws from the jaw unit into racking engagement with the comb bar and operable towards the end of a jaw-opening movement of the jaw-actuating means to traverse the jaw unit a predetermined distance along the comb bar to position the jaws for their next closing movement.

The machine thus consists of two separable main elements; the jaw unit and the comb bar; these elements are not connected by any separate framed structure. As will be shown below, the comb bar also includes a securing rod for securing the open hooks in it; but what is important to recognise is that only these two units have to be brought to a belt to be jointed, regardless of the width of the belt. They can be applied to the belt together, or the jaw unit can be slidably connected to the comb bar after the latter has been applied to the belt. As soon as the jaws close to press the first hook into the belt-end, the comb bar is held to the belt by that hook and the subsequent operation of the jaw progresses the jaw unit transversely of the belt until all the hooks in the comb bar have been pressed into the belt. If the belt is wider than the hook capacity of the comb bar, the bar (with fresh hooks) may then be moved along the edge of the belt and the jaw unit caused to progress once again along the bar.

The pawl projecting in the same direction as the jaws from the jaw unit, it can be operated from the jaws themselves, or from a part of the jaw-actuating mechanism that is closely connected with the jaws, for example a toggle pin or a toggle link by which the jaw movement is directly effected. It can thus be ensured that the racking movement is not only precise but dependent on the jaws having reached a sufficiently open position for them to pass over the next open hook in the comb bar to be pressed into the belt. Even if, say, long jaw-actuating handles become bent, they must still be operated sufficiently to open the jaws properly before the racking movement can take place.

The comb bar is a hollow member, with slides at the rear to fit notches in the jaw unit whereby the jaw unit can slide along the bar, and with parallel slots at the front entering the hollow to receive the looped portions of open hooks, a securing rod being insertable lengthwise of the hollow to pass through the loops to lock the hooks to the bar.

The securing rod may have a catch to prevent its complete withdrawal from the comb bar. Accidental withdrawal and possible loss of the rod are thus prevented.

The rear face of the comb bar may be provided with rack teeth for engagement by the pawl projecting from the jaw unit. Alternatively, the hollow in the comb bar may continue through the rear of the bar to enable the pawl to engage the loops of hooks in the bar, which loops then serve as ratchet teeth.

The comb bar may be provided with a pivoted stop to prevent accidental disengagement of the jaw unit and the comb bar.

According to a further feature of the invention, the comb bar carries a clamping device to engage the belt locally, to provide for an initial location of the comb bar (and, therefore, of the jaw unit) with respect to the end edge of the belt. This clamping device may be adjustable along the comb bar, conveniently being secured by the rod used to secure hooks in the bar.

The invention will now be described in greater detail with reference to the accompanying drawings, in which—

Figure 1 is a plan of the jaw unit constituting one major element of the complete machine;

Figure 2 is a side elevation of the jaw unit of Figure 1, taken from the left-hand side;

Figure 3 is an end elevation of the jaw unit, taken from the top of Figure 1;

Figure 15:
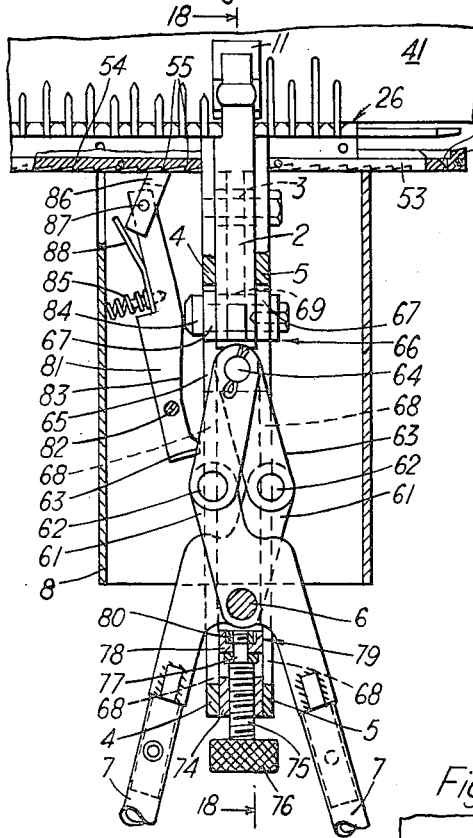
Figure 18:
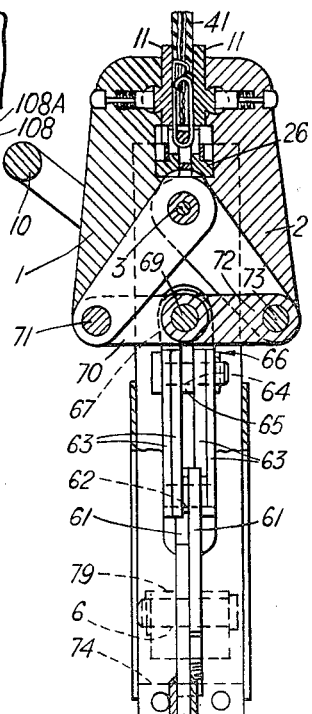
Figure 16:
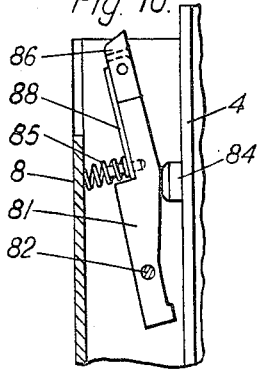
Figure 17:
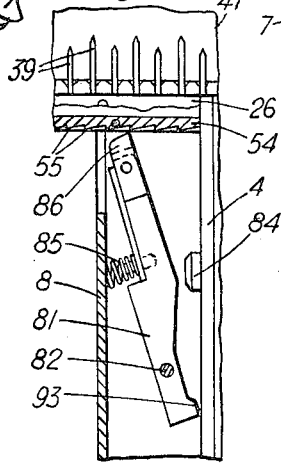

Figures 4 and 5 are enlarged sectional details of the jaws, taken respectively on the line 4—4 of Figure 5 and the line 5—5 of Figure 4;

Figure 6 is a plan of the comb-bar, with an adjustable clamp and a hook-securing rod, forming the other major element of the machine, hooks being shown in the comb bar and the end of a belt being shown in position to receive the hooks;

Figure 7 is a side elevation of the hook-securing rod;

Figure 8 shows the adjustable clamp of Figure 6 detached from the comb bar;

Figure 9 is a section through the clamp and the comb bar, taken on the line 9—9 of Figure 6;

Figure 10 corresponds to Figure 6, but shows the comb bar clamped in another position with respect to the end of the belt;

Figures 11 and 12 are fragmentary side and end elevations showing the position and function of a hook stop to position the open hooks in relation to the jaws, Figure 11 being a section on the line 11—11 of Figure 12;

Figures 13 and 14 correspond to Figures 11 and 12, but show how a closed hook passes the hook stop, Figure 13 being a section on the line 13—13 of Figure 14;

Figure 15 is a part-sectioned plan of the operative end of the jaw unit as seen in Figure 1, showing the internal pawl- and other mechanism, together with a comb bar interengaged with the jaw unit and provided with hooks to be inserted into the end of a belt, also shown; it also shows one position of a pivoted stop on the comb bar;

Figure 16 is a detail of Figure 15, showing the pawl-mechanism in inoperative position;

Figure 17 corresponds to Figure 16, but shows the position of the pawl-mechanism during disengagement of the comb bar;

Figure 18 is a section on the line 18—18 of Figure 15, showing the jaws closed;

Figures 19 and 20 correspond to Figures 15 and 18, but show the jaws open, Figure 20 being a section on the line 20—20 of Figure 19; Figure 19 also shows another position of the pivoted stop shown in Figure 15;

Figures 21 and 22 are fragmentary views corresponding to Figures 15 and 19, to illustrate a modification of the comb bar and jaw unit, in two different operative positions;

Figures 23 and 24 again correspond to Figures 15 and 19, but show another modification of the jaw unit;

Figure 25 shows a comb bar with a non-adjustable clamp; and

Figure 26 shows a catch to prevent complete withdrawal of the securing rod from the comb bar.

In Figures 1 to 3, each of a pair of jaw levers 1, 2 is carried on a pivot 3 (see also Figure 15) extending transversely between side plates 4, 5 constituting a main frame, which also carries between the plates 4, 5 a pivot 6, at right-angles to the pivot 3, for a pair of operating-handles 7. To the sides of the plates 4, 5 are secured open-ended casings 8, 9, to enclose parts of the jaw-actuating mechanism (to be described below) by which closing of the handles 7 causes the jaw levers 1, 2 to close beyond the plates 4, 5 and also to enclose pawl-mechanism (also described below) operated by movement of the jaw-actuating mechanism. To the underside of the casings 8, 9 is secured a skid 10 to support the jaw end of the complete jaw unit and to permit it to slide transversely, with the jaw lever 1 clear of the supporting surface on which the skid rests. The handles 7 are shown integral with the remainder of the jaw unit, but obviously they could be detachable.

The jaw levers 1, 2 are provided with interchangeable cheeks 11, harder than the levers themselves, to resist wear. As shown in Figures 4 and 5, each cheek 11 has a projection 13 nearly a full circle in section, joined to the cheek by a neck 14 and fitting a corresponding transverse recess 15 in the jaw lever. A cylindrical bore 16 runs into the jaw lever midway of the length of the recess 15 to contain a plunger 17, between which and the inner end of the bore 16 a compression spring 18 is inserted. A continuation bore 19 of smaller diameter receives a stem 20 carried by the plunger, the stem ending in a cross-bar 21 of a length greater than the thickness of the jaw lever (Figure 5), to receive which cross-bar the lever has a transverse slot 22. A notch 23 milled through the projection 15 on the cheek 11 receives the end of the plunger 17 under the urge of the spring 18, when the cross-bar fits into the slot 22. By pulling on the cross-bar by grasping its ends where they protrude beyond the sides of the jaw lever, the plunger 17 may be retracted from the notch 23, when the cheek 11 may be withdrawn. The plunger 17 is similarly retracted for the re-insertion of the cheek 11 or of a replacement cheek. The plunger 17 may be held retracted by rotating the cross-bar 21 out of line with the slot 22.

Figure 5 shows the cheek face to be serrated at 24 over part of its width and relieved at 25 over the remainder of its width, for a purpose to be described later.

The jaw unit, as described in broad outline above, is a light and readily portable hand-operated tool, capable of being brought into position for inserting joint hooks into the end of a conveyor belt, even when the belt is in a confined situation, and particularly a situation of very low height. It is used with a comb bar now to be described.

As shown in Figures 6, 8, and 9, the comb bar 26 is of hollow T-section, the forwardly facing stem 27 of the T being transversely slotted at 28 at regular intervals with a width and spacing of slot corresponding to the gauge and spacing of the hooks to be inserted into the belt. The arms 29 at the rear of the T-section are of a width to form slides to fit into T-notches 30 (Figures 2, 11, 13 and 20) in the ends of the side plates 4, 5 of the jaw unit, which ends stop clear of the jaw cheeks 11. A securing rod 31 (Figure 7) is formed of round wire 32 with a flat face 33, and can be inserted into the hollow interior of the comb bar constituted by a lengthwise slot 34 (Figure 9) formed from the rear face 35 of the comb bar and of a depth to leave a thin bridge 36 (Figure 13) inside each "tooth" of the bar lying between adjacent slots 28. The flat face 33 of the rod 31 bears against this bridge 36, so that the curved face of the rod reaches about halfway down the depth of the slots 28. The rod 31 is provided with a handle 37 at one end. At the other end it has a taper 38 to facilitate its insertion.

Each slot 28 of the comb bar 26 is adapted to receive an open hook, a hook 39 of typical form, with pointed limbs of unequal length, being shown in Figure 11. Hooks of the required gauge (corresponding to the width of the slots 28) assembled in stiff paper (not shown), with long and short hook limbs alternating and with the paper slotted to correspond with the spacing of the slots 28, form a "comb," of any length within the capacity of the comb bar, which "comb" may be quickly applied so that the looped bases 40 of the hooks enter the slots 28. (To avoid obscuring the hooks themselves, no attempt is made to show the supporting paper in any of the figures.) After the bases 40 of the hooks have been placed in the slots 28, the securing rod 31 is inserted from the left-hand end of the bar 26 (Figure 6) to secure all the hooks in the bar. The bar, complete with hooks, is then ready to be applied to a belt to receive the hooks.

Figure 6 shows an end portion 41 of belt, with its end edge 42 cut square to the length of the belt, to fit close to the bridges 36 of the comb bar "teeth." The comb bar 26 is secured to the belt 41 by a clamp 43 having a clamping plate 44 (Figure 9) overhung by a bracket 45 to leave a gap 46 great enough to take the thickness of any belt within the capacity of the machine. A screw 47 carried by the bracket 45 has a knurled head 48 to enable the blunt end of the screw to press the belt to the plate 44. As shown in Figures 6, 8, and 10, the clamp is cranked. This enables hooks 39 to be positioned as near the side 49 as is desired, without interference from the clamp (Figure 10), and yet brings the screw well inside the edge 49 of the belt.

The width of the clamp members 44, 45 is such as to embrace two of the slots 28 and the "tooth" between them, and a notch 50 (Figure 8) provides two tongues to fit any two adjacent slots 28. The tongues are drilled at 51 to fit the round face of the wire 32 of the rod 31, so that insertion of the rod secures the clamp in any desired position along the bar 26. At the left-hand end of the bar, a wider notch 52 is cut, as a ready guide for the more usual position to be occupied by the clamp (Figure 6), i.e., when the bar 26 contains hooks 39 in all its notches 28; but, as shown in Figure 10, the clamp may be inserted elsewhere along the bar.

The arms 29 of the T-section of the bar extend beyond the length occupied by the slots 28, there being a tapered extension 53 (Figures 6 and 10) to enable an easy entry to be made into the notches 30 of the jaw unit, for location of the jaw unit on the comb bar before the first hook 39 at the right-hand end of the bar encounters the jaw cheeks 11.

The comb bar as shown in Figures 6, 8, 9, and 10 corresponds to that shown in Figures 15 and 17 in that it has the underside of the lengthwise slot 34 closed by a hardened ratchet-strip 54, with teeth 55 having the same spacing as the slots 28. The teeth 55 face the left-hand end of the bar, to enable a pawl in the jaw unit to propel the latter from right to left along the bar.

The initial application of the jaw unit to the comb bar by fitting the notches 30 to the extension 53 brings the lower limb of the first (and, of course, open) hook 39 in the bar into contact with a hook stop 56 (Figures 11 to 14) on the side plate 5 of the jaw unit. The stop consists of a short angle bracket, with its vertical limb 57 secured to the outside of the plate 5 and with its horizontal limb 58 reaching the underside of the T-stem 27 of the comb bar. The horizontal limb 58 is notched at 59 (Figure 11) to provide free passage for the lower of two side plates 60 of the comb bar. The stem of the T-notches 30 is wider than the stem 27 of the comb bar, to allow for the thickness of the plates 60. The edges of the plates 60 assist, with the stem 32 of the securing rod 31, in holding the open hooks in the position shown in Figure 11. The stop 56 ensures that an open hook 39 cannot pass the end of the side plate 5 and that each open hook is correctly positioned to be closed by the cheeks 11. When closed, each hook 39 has its limbs brought to the horizontal (Figure 13) and thus the lower limb can pass over the stop (Figure 14), when the next hook is in turn brought into contact with the stop.

The jaw unit enables the cheeks 11 to close the hooks with very considerable pressure, as is necessary first for the penetration of the tough material of conveyor belting, and second for pressing the limbs of the hooks close to the faces of the belt. As shown in Figures 15 and 16, double toggle mechanism is used to develop the pressure.

Beyond their common pivot 6, the handles 7 have short arms 61 (Figures 15 and 18), which enables the handles to operate with very heavy leverage. Each short arm 61 is pivoted at 62 to a pair of toggle links 63, there thus being four links, all of which are pivoted at 64 to a central web 65 of a slider 66, side members 67 of which fit lengthwise slots 68 in the side plates 4, 5. The lever arms 61 and the toggle links 63 are free to move through the slots 68. At right angles to the pivot 64, the wings 67 of the slider 66 carry a pivot 69, parallel to the common pivot 3 of the jaw levers 1, 2, and from this pivot 69 two toggle links 70 extend to a rear pivot 71 of the jaw lever 1, and a single toggle link 72 (between the links 70) extends to a rear pivot 73 of the jaw lever 2. When the links 70, 72 extend in a line, as in Figure 18, the jaw cheeks 11 make their closest approach to each other. In being pressed towards this in-line position by the action of the toggle links 63, the toggle links 70, 72 exert very great closing power on the jaw cheeks 11. The serrated portions 24 (Figure 5) of the cheeks engage an open hook to press its points through the belt and to close its limbs against the belt; the relieved portions 25 engage the limbs of an already inserted hook at the next closing of the jaws.

The closing of the jaw cheeks 11 is adjustable in accordance with the thickness of the belt to receive the hooks. For this purpose, the pivot 6 of the handles 7 is adjustable lengthwise of the side plates 4, 5 (Figure 15). At the end remote from the jaws, the plates 4, 5 have secured between them a block 74, tapped to receive a screw 75 with a knurled head 76. A plain stem 77 on the screw 75 passes through the rear end 78 of a slider 79, where it is held (free to rotate) by a nut 80. The slider 79, movable between the plates 4, 5, carries the pivot 6. If the screw 75 urges the pivot 6 away from the block 74, the handles 7 are able to bring the jaw cheeks 11 closer together than when the screw 75 draws the pivot towards the block, so that between the limiting positions of the pivot 6 a wide range of belt thicknesses may be accommodated, with negligible variation in the pressure applied by the jaw cheeks 11 when the handles 7 are fully closed. For any thickness of belt, the knob 76 is initially rotated until the cheeks 11 fit the faces of the belt when the handles 7 are closed to close the jaw levers 1, 2.

Figure 15 shows a pawl-carrying lever 81 mounted in the casing 8 on a pivot 82 parallel to the toggle pivot 64, i.e., the lever 81 moves in a plane normal to that of the jaw levers 1, 2. The lever 81 is disposed alongside the toggle mechanism by which the jaw levers are operated, and on its inner edge it has an inclined portion 83 for engagement by the projecting head 84 of the toggle pivot 69 from which the jaw levers 1, 2 are directly operated. In the position shown in Figure 15, the head 84 has urged the lever 81 counter-clockwise against a spring 85, and this brings a pawl 86, pivotally mounted at 87 on the lever, away from the side plate 4. The pawl 86 occupies a position alongside the jaw levers 1, 2 and projects beyond the casing 8 in the same direction as the jaw cheeks on the levers 1, 2, i.e., away from the handles 7.

If there is no comb bar 26 in the jaw unit, the pawl 86 is held in line with the lever 81 by a leaf spring 88, and then projects slightly from the casing 8, as shown in Figure 16. If a comb bar is now inserted, by a movement from left to right, the pawl 86 is rocked about the pivot 87 as the teeth 55 move over it, and reaches the position shown in Figure 15. In that position, the point of the pawl is in the second tooth space from the plate 4.

When, as shown in Figures 19 and 20, the handles 7 are fully opened, the head 84 of the pivot 69 has left the incline 83. As the head 84 approaches the position in Figure 17, its beveled edge 89 engages a long incline 83. As the head 84 approaches the position in Figure 19, its bevelled edge 89 engages a short incline 90 on the lever 81 to urge the lever to a position limited by contact of its pawl end with the side plate 4, when the end face 92 of the head engages a face 93 near the end of the lever 81. The pivot 82 being near to the incline 90 that is engaged by the bevel 89, and remote from the pawl 86, the pawl is brought very rapidly from the position in Figure 15 to the position in Figure 19 just before the jaw cheeks 11 reach their fully opened position. The engagement of the pawl 86 with the face of the first rack tooth 55 from the side plate 4 is thus delayed until the jaw cheeks are opened sufficiently for the next open hook 39 in the comb bar 26 to pass between them. After first engagement of the pawl with a tooth 55, the whole jaw unit is rapidly moved along the comb bar 26 (and the belt 41) by the space of one tooth, and is brought into position for the jaw cheeks to be closed again by the next closing of the handles 7. As the jaw unit is racked along the comb bar, its supporting skid 10 slides easily along the ground.

When the handles 7 are closed (Figure 15), the comb bar 26 may be withdrawn (right to left), notwithstanding the engagement of the pawl 86 with the toothed strip 54. This is because (as shown in Figure 17), the lever 81 is free to be rocked counter-clockwise against the action of the spring 85 until the end of the face 93 meets the side plate 4, by which time the pawl 86 has retracted until the teeth 55 can ride over it. It is, therefore, merely necessary to close the handles 7 to enable a comb bar 26 to be engaged to the jaw unit or to be disengaged from it.

The operation of the machine is certain, as well as rapid, because the racking of the jaw unit along the comb bar is controlled by the pivot 69, that is common to the links 70, 72 that act directly on the jaw levers 1, 2. The pawl 86 is forced to the position shown in Figure 19 as the jaw cheeks 11 close on to an open hook 39, and is only caused to re-engage the face of the next tooth 55 when the jaw cheeks have been opened sufficiently for the clear passage of an open hook by the positioning of the pivot 64 that also effects the racking stroke of the pawl. Moreover, the hook stop 56 ensures that the next open hook is correctly positioned for engagement by the jaw cheeks after each movement of the jaw unit along the comb bar.

Although the spacing of the teeth 55 is shown equal to the spacing of the slots 28 in the comb bar, it could be equal to a multiple of the slot-spacing, so that more than one hook could be pressed simultaneously by the jaw cheeks, the jaw unit then advancing by multiplies of hook-spacings after each full operation of the handles 7.

In Figures 21 and 22, a comb bar 94 has no inserted rack. The internal lengthwise slot 95 is open for the penetration into it of a longer pawl 96, which engages in turn the bases 97 of the hooks 39, until, reaching the position shown in Figure 22, the pawl has racked the jaw unit along the comb bar (and the belt) into position to close the next hook now finding itself between the jaw cheeks. The hooks themselves thus constitute a rack, necessarily of the correct pitch, for the positioning of the jaw unit. Again, the final positioning is assisted by the provision of a hook stop 56 as previously described (but not visible in Figures 21 and 22).

In Figures 23 and 24, an alternative pawl mechanism is positioned inside the casing 9, to engage teeth 55 on a comb bar 26. The pawl 98 projects from the casing 9 in the same direction as the jaws and is carried by a lever 99, pivoted at 100 in the casing 9 and connected by a link 101 to a pivot point 103 on one of the toggle links 63 that is connected to the slider 66, which moves with the toggle pivot 69 by which the jaw levers 1, 2 are directly actuated. As the link 63 moves from its position in Figure 23, the link 101 swings about its pivot 104 with the lever 99 with but slight effect on the latter; but, as the position in Figure 24 is approached, the link 101 moves rapidly into line with the lever 99, and the pawl 98 effects rapid engagement with the face of a tooth 55 to rack the jaw unit along the comb bar 26. The pawl 98 is hollow, to fit over a stem 105 forming the second arm of the lever 99, with a compression spring 106 to urge the pawl outwards, between limits governed by the pin-and-slot connection 107. The spring 106 enables the pawl 98 to mesh fully with a tooth 55 when the dead-centre position of Figure 22 is reached, and also allows the teeth 55 to ride over the pawl both when the jaw unit is being fitted to the comb bar, and when the comb bar is being disengaged from the jaw unit.

It is, of course, the hook 39 nearest the extension 53 of the comb bar 26 that is first inserted into the belt 41 when the jaw unit is operated. This hook is indicated at A in Figure 6, which shows a comb bar with its full complement of hooks in position at the end of a belt of greater width B than the width C occupied by the hooks, so that the adjustable clamp 43 has to be secured in its special notch 52. When all the hooks have been progressively inserted over the width C, there remains the rest of width B of the belt 41 to be provided with hooks, i.e., the width D shown in Figure 10. After the jaw unit is removed from the comb bar 26, and the securing rod 31 withdrawn from the comb bar 26, the clamp 43 is released from the belt 41, and is replaced in engagement with two of the hook notches 28, in the position shown in Figure 10, which permits the insertion in the comb bar of the open hooks required for the width D, these being secured by the rod 31. The clamping screw 47 is then tightened on to the belt 41, near its side 49, with the end edge 42 of the belt in contact with the length of the comb bar.

At this stage, the end of the comb bar is in contact with the last hook E of those inserted in the width C, in the looped portion of the hook that projects beyond the edge 42 of the belt, and this maintains the uniformity of spacing of the hooks over the combined widths C and D. The projecting end of the stem 32 of the rod 31 enters the loops of some of the hooks in the width C. The jaw unit is then operated to insert progressively the hooks over width D, to complete the whole width of the belt 41. The clamp 43 is released, and the securing rod withdrawn, for the comb bar 26 to be detached from the belt.

It is important that the edge 42 of the belt 41 be kept against the comb bar until the first hook of each series has been inserted in the belt. After this, the belt edge is kept against the comb bar by the engagement of that first hook at one end of the series, and by the clamp 43 near the other end of the series, which assists in maintaining a uniform projection of all the hook loops, necessary for accurate linking of one belt end with another.

The machine is thus not restricted as to the width of belt to be provided with hooks, because the comb bar can be applied to successive part-widths of a belt that is wider than the operative length of the comb bar. At the same time, the simple clamping device on the comb bar enables the bar to be held close to the end edge of the belt, at whatever portion of the width of the belt where the bar is to be applied. Consequently, all the hooks are inserted to an accurate line, even in the case of very wide belts.

For assisting portability of the complete machine when not in use, the comb bar, complete with securing rod 31 and clamp 43, may be slid through one of the jaw unit casings 8, 9 not occupied by the pawl mechanism, i.e., through the casing 9 in Figure 15, and the casing 8 in Figure 23.

The comb bar 26 may be held against accidental removal from the jaw unit by the provision of a stop 108 pivoted in a slot 108A in the extension 53, as shown in Figure 15, and capable of being swung down into the position shown in Figure 19, so as to slide through the notches 30. This enables the jaw unit to be carried with the comb bar already in position through the jaws, thus facilitating the application of the comb bar to the end of a belt.

As shown in Figures 1 and 2, cover plates 109 are secured over the gaps between the side plates 4 and 5, to protect the toggle mechanism and sliding pivot 6 against ingress of foreign matter.

Instead of the comb bar 26 having a clamp 43 that is adjustable to any position along the bar, a fixed clamp 43A may be provided, as shown in Figure 25, this being secured by a screw 43B. In this case, a separate adjustable clamp 43 may be provided for use when the comb bar is provided with less than its full complement of hooks 39.

As shown in Figure 26, the securing rod 31 may be formed near its end 110 with a notch 111 into which engages a catch 112 to prevent complete withdrawal of the rod from the comb bar 26. The catch 112 lies in the lengthwise slot 34 of the bar 26 being pivoted transversely at 113 and urged towards the rod 31 by a spring 114.

Although the handles 7 have been shown as opening and closing by a sideways movement, the handles could, with obvious modification of the toggle mechanism, be arranged to open and close by a vertical movement.

What I claim is:

1. A belt-fastening machine comprising as two separate integers a comb bar and a jaw unit, the comb bar being formed to receive a row of open hooks, which project from the front of the bar, and provided with means for clamping it to a belt end, and the jaw unit having guide slots into which the comb bar fits for connecting the two integers together, the jaw unit then being slidable lengthwise of the comb bar, jaws in the jaw unit, operating means including toggle mechanism connected to the jaws for closing and opening the jaws, the jaws being so shaped as to embrace the comb bar when they are closed to press hooks in the bar into the belt end, rack teeth disposed along the rear of the comb bar, a pawl mounted in the jaw unit and pivotally movable towards the said teeth, and means forming an operating connection between the toggle mechanism and the pawl to pivot the pawl into racking engagement with the teeth so as to propel the jaw unit progressively along the comb bar after each closing of the jaws by the operating mechanism.

2. A belt-fastening machine comprising as two separate integers a comb bar and a jaw unit, the comb bar being formed to receive a row of open hooks and to be applied, with the hooks, to a belt end, and the jaw unit being formed to have sliding interengagement lengthwise of the comb bar, comprising for this purpose side plates, with slots in one end of the side plates to receive the comb bar, there being jaws pivoted in the side plates to embrace the comb bar when the comb bar and the jaw unit are so interengaged, toggle mechanism between the side plates to close the jaws on to hooks in the comb bar, handles pivoted in and projecting beyond one side plate to actuate the toggle mechanism, a casing surrounding the toggle mechanism, a pawl lever pivoted in the casing alongside the toggle mechanism, a pawl carried by the lever and projecting into racking engagement with the comb bar, and means connected to the toggle mechanism to operate the pawl lever to effect racking of the jaw unit along the comb bar after each operation of the jaws.

3. A belt-fastening machine comprising as two separate integers a comb bar and a jaw unit, the comb bar being formed to receive a row of open hoops, which project from the front of the bar, and having a lengthwise slot along its rear to expose the bases of the hooks, the comb bar also being provided with means for clamping it to a belt end, and the jaw unit having guide slots into which the comb bar fits for connecting the two integers together, the jaw unit then being slidable lengthwise of the comb bar, jaws in the jaw unit, operating means including toggle mechanism connected to the jaws for closing and opening the jaws, the jaws being so shaped as to embrace the comb bar when they are closed to press hooks in the bar into the belt end, a pawl mounted in the jaw unit and pivotally movable into the slot along the rear of the comb bar, and means forming an operating connection between the toggle mechanism and the pawl to pivot the pawl into the slot along the rear of the comb bar and into racking engagement with teeth constituted by the bases of the hooks, so as to propel the jaw unit progressively along the comb bar after each closing of the jaws by the operating mechanism.

4. A jaw unit for a belt-fastening machine of the type including a comb bar having ratchet teeth along its rear, said jaw unit comprising projecting jaws, operating means including toggle mechanism connected to the jaws for opening and closing the jaws, a pawl projecting in the same direction as the jaws and pivotally mounted in the jaw unit, and means forming an operating connection between the toggle mechanism and the pawl to pivot the pawl in a direction to effect racking engagement with the teeth of a comb bar to which the jaw unit is applied.

5. A jaw unit as in claim 4, comprising a pawl lever pivoted in the jaw unit to carry the pawl, and a pin projecting from and movable with the toggle mechanism to engage the pawl lever for pivoting of the lever and pawl as the toggle mechanism is operated.

6. A jaw unit as in claim 4, comprising a pawl lever pivoted in the jaw unit to carry the pawl, and a link connecting the toggle mechanism to the lever to effect pivoting of the lever and pawl as the toggle mechanism is operated.

7. A comb bar for a belt-fastening machine of the type including a jaw unit having a racking pawl operable with the jaws of the unit, said comb bar having a front face slotted to receive open hooks with looped bases and a hollow space lengthwise through itself, a securing rod for insertion along the space and through the looped bases, slides along the bar for slidable engagement with the jaw unit, and ratchet teeth along the rear of the bar to be engaged by the racking pawl of the jaw unit.

8. A comb bar for a belt-fastening machine of the type including a jaw unit having a racking pawl operable with the jaws of the unit, said comb bar having a front face slotted to receive open hooks with looped bases and a hollow space lengthwise through itself, a securing rod for insertion along the space and through the looped bases, slides along the bar for slidable engagement with the jaw unit, and a lengthwise slot along the rear of the bar and opening into the hollow space to expose the looped bases, the latter serving as ratchet teeth to be engaged by the racking pawl of the jaw unit.

References Cited in the file of this patent

UNITED STATES PATENTS

| 1,238,964 | Vanderveld | Sept. 4, 1917 |
| 2,167,820 | Ziller | Aug. 1, 1939 |

FOREIGN PATENTS

| 714,171 | Germany | Nov. 22, 1941 |
| 714,959 | Great Britain | Sept. 8, 1954 |